Aug. 8, 1961 A. SERAGNOLI 2,995,234
MECHANISM FOR DISTRIBUTING AND CONVEYING ARTICLES INTO A MACHINE
Filed Feb. 20, 1957 7 Sheets-Sheet 1

Inventor: Ariosto Seragnoli
By: Watson, Cole, Grindle & Watson
Attys.

Aug. 8, 1961  A. SERAGNOLI  2,995,234
MECHANISM FOR DISTRIBUTING AND CONVEYING ARTICLES INTO A MACHINE
Filed Feb. 20, 1957  7 Sheets-Sheet 5

Fig. 8

Aug. 8, 1961 A. SERAGNOLI 2,995,234
MECHANISM FOR DISTRIBUTING AND CONVEYING ARTICLES INTO A MACHINE
Filed Feb. 20, 1957 7 Sheets-Sheet 6

Aug. 8, 1961   A. SERAGNOLI   2,995,234
MECHANISM FOR DISTRIBUTING AND CONVEYING ARTICLES INTO A MACHINE
Filed Feb. 20, 1957   7 Sheets-Sheet 7

Fig. 11

INVENTOR
Ariosto Seragnoli
BY
Watson, Cole, Grindle, Watson
ATTORNEY

United States Patent Office 2,995,234
Patented Aug. 8, 1961

2,995,234
MECHANISM FOR DISTRIBUTING AND CONVEYING ARTICLES INTO A MACHINE
Ariosto Seragnoli, Via Indipendenza 56, Bologna, Italy
Filed Feb. 20, 1957, Ser. No. 641,321
Claims priority, application Italy Feb. 25, 1956
13 Claims. (Cl. 198—24)

Various types of mechanisms for distributing and conveying articles into a machine are known, comprising an intermittently rotating disc provided on the periphery with holes, each of which is adapted to receive and to contain an article. Below the holes supports for the articles entering them are provided. On a certain portion of the disc an enclosure is provided, which confines an internal area thereon, intended to receive in bulk the articles to be distributed, and an external area for the removal of the articles.

In the said external removing area, every time the disc stops, means enter into action which, by entering the holes, get hold of and withdraw the articles contained therein and feed them into a machine, generally together with sheets of paper or the like for the wrapper, which are delivered by means of known devices of various types.

There are also known mechanisms comprising a disc with holes arranged as stated above and on which an enclosure is provided, which encircles its whole surface, whereas in an area of removal inside the said enclosure a separator is provided, which covers at least one hole.

Under the separator there is a channel into which the distributed articles fall one at a time when the holes of the disc pass thereon, whereas the separator prevents the falling down of the articles lying above.

These types of mechanisms are adapted to distribute and to feed articles only at a relatively slow rate; it is not possible to perform the operation at a high rate, as the articles are then unable to drop into the holes, or if they do they are not positioned therein in the proper manner, so that it is impossible for them to be gripped and to be removed from the holes with a view of feeding them into a machine.

Furthermore, from said devices waste material, fragments of articles and dust often fall down on the feeding members which soil them and cause trouble in the operation.

With the present invention, these drawbacks are avoided, by making use of at least one distributing disc and a conveying means, which cooperate with each other.

The distributing discs are provided on the periphery with holes, and also the conveying means has holes, which are intended to receive the articles; bearing means are provided below for the articles contained in the holes.

The conveying means is intended to receive from the distributing discs the distributed articles and to convey them to an area of removal, where other means withdraw the articles from the holes of said conveying means and feed them into a machine.

Above the distributing discs there are provided enclosures to receive in bulk the articles to be distributed, and means to separate from such articles in bulk those which have been able to enter the holes.

The distributing discs partially extend below or above the conveying means and their holes are arranged in such a way as to align with those of the conveying means; the discs and the conveying means are intermittently rotated, so that during a few or all of the phases of rest of the conveying means at least one hole of a distributing disc is aligned with an empty hole of the conveying means.

In said phases of rest means enter into action, which take the articles from the distributing discs to the conveying means, from which in turn they are removed and fed into a machine.

By this arrangement, favorable conditions for the operation of the distributing discs are obtained, so that in each of them, in a given time, it will be possible to distribute into the holes a number of articles which is greater than that achieved with the known systems.

A particularly favorable condition can be obtained if there are at least two of the distributing discs. First of all it is to be observed that usually the conveying means, at each pause in its forward movement, conveys a hole containing an article to the means performing removal and feeding into a machine.

Figure 3:
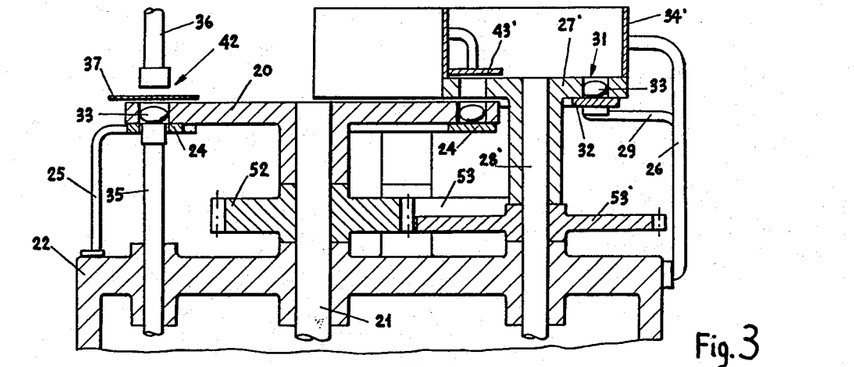
FIG. 3 is a diagrammatic section of the mechanism in an alternative form of embodiment, according to line 11—11 of FIG. 4.
Figure 4:
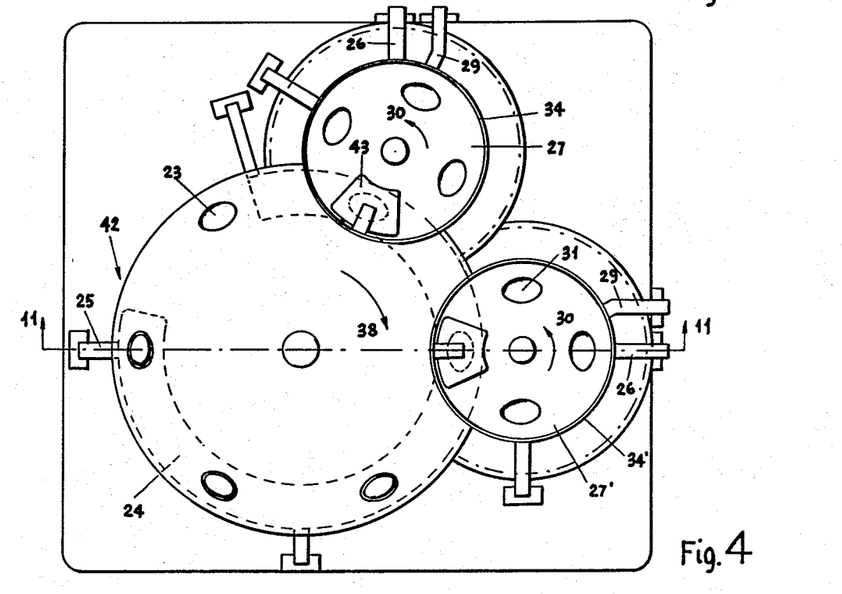
FIG. 4 is a diagrammatic view from the top of the mechanism of FIG. 3, in which the elements 36 and 37 are omitted.

If now, for example, there are two distributing discs, in order to achieve the filling up of all of the holes of the conveying means, it will be sufficient for the distributing discs to have pauses whose number is only half that of the conveying means, provided that at each pause the distributing discs rotate through the angle between two subsequent holes of the disc. However, it has been observed that the penetration and the proper location of the articles within the holes are greatly facilitated and appear to be more satisfactory by giving the rotating distributing discs a number of pauses greater than that absolutely necessary as stated above, so that several pauses occur during rotation of the distributing discs through the angle between two subsequent holes therein. Also this particular arrangement represents a feature of the inventoin and is in agreement, for example, with the manner of working of the preferred form of embodiment as illustrated in FIGURES 3 and 4.

The rate of feeding the articles into a machine may be increased at will by providing a suitable number of distributing discs in conjunction with a conveying means.

Moreover, the distributing area is moved away from the feeding area and the waste materials, fragments, dust, etc., which are being formed during the operation, do not reach it, thus avoiding the aforesaid drawbacks.

Accordingly, the primary object of the present invention is the provision of a mechanism for rapid distribution and conveyance of articles from a bulk source thereof into a machine.

Other and further objects to become evident from the following description:

The invention is disclosed, by way of example only, without any limitation, with reference to preferred forms of embodiment concerning the feeding of articles into a wrapping machine, as illustrated in the annexed drawings in which.

Figure 1:
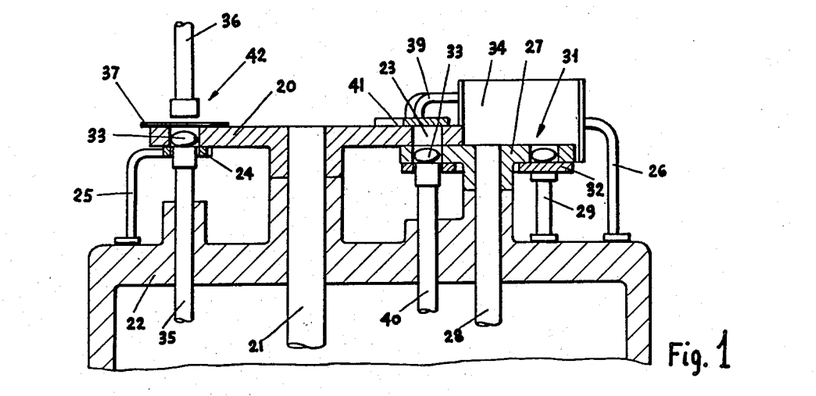
FIG. 1 is a diagrammatic vertical section of the mechanism according to line 10—10 of FIG. 2.
Figure 2:
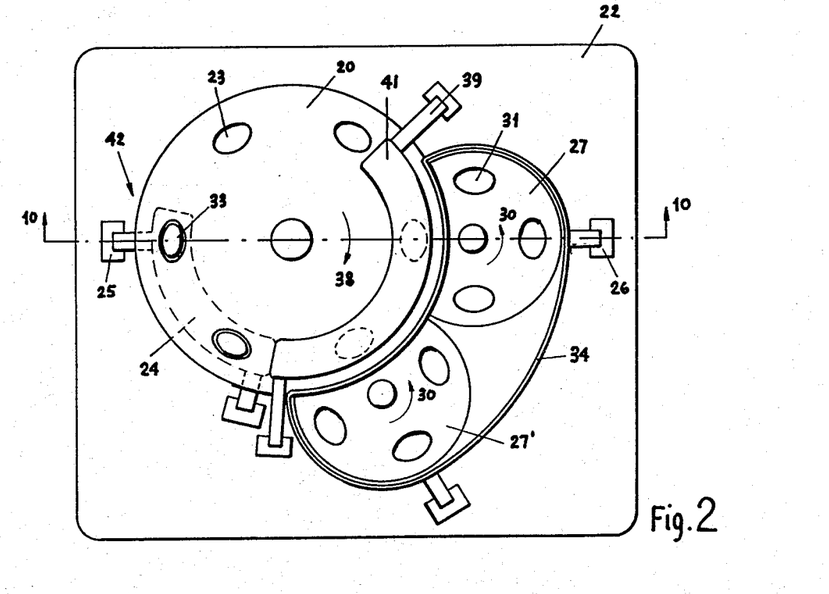
FIG. 2 is a diagrammatic view from the top of the mechanism of FIG. 1, in which the elements 36 and 37 are omitted.

According to a preferred form of embodiment, FIGURES 1 and 2, the invention comprises a conveying means formed from a disc 20 having a vertical axis, which is carried by shaft 21 guided in the stationary base 22.

The disc 20, on a circumference concentric with shaft 21, is provided on the periphery with holes 23 equally spaced between each other, beneath which bearing means 24 are arranged, secured to the base 22 by means of supports 25.

By any type of well known means, of a Maltese cross mechanism connected directly or through a tooth gear to shaft 21, the conveying disc 20 is caused to intermittently rotate in the direction of arrow 38, alternating between phases of movement and phases of rest.

At a level lower than that of disc 20, two distributing discs 27, 27' are provided, carried by shafts 28, 28' which are guided in the base 22 and caused to intermittently rotate by means of suitable mechanisms, such as Maltese crosses and tooth gears, in the direction of arrow 30.

The discs 27, 27' are provided at the periphery with bottomless holes 31, under which bearings 32 are provided, secured by means of supports 29 to base 22, to sustain the articles 33 which have been able to place themselves in the holes 31. The discs 27 and 27' partially extend under the disc 20 and the bearing means 24 are discontinued in the areas in which the discs are overlapped.

Also in the discs 27, 27' the holes are spaced apart at equal intervals upon circumferences and are concentric with the respective axes of rotation.

Upon the discs 27, 27' by means of supports 26 an enclosure 34 is secured to the base into which is delivered in bulk the articles to be distributed.

In the areas in which the coincidence of the holes of the distributing discs takes place with those of the conveying disc, the bearings 32 are discontinued and there are lifting elements 40, 40' guided in the base 22 and operated at the right moment by devices of the usual type: above the conveying disc a stationary stop plate 41 is provided, secured to the base by means of supports 39.

In an area 42 of disc 20 not located above the discs 27, 27' means are provided to remove the articles from the holes 23 and to feed them into a machine.

These means are formed from a lifting element 35 guided in the stationary base 22, and from a counter-lifting element 36 located above element 35, where by feeding means of the usual type, not shown in the drawings, a sheet of paper 37 may be conveyed above the article to be fed 33, in order to provide for the subsequent wrapping operations.

The control of the intermittent rotation of the discs is performed in such a manner that every distributing disc has phases of rest partially superposed, as far as time is concerned, to the phases of rest of the conveying disc, so that the movement of the distributing disc starts again when the movement of the conveying disc has already started. The phases of movement are calculated in such a way that during said periods of rest the holes of the distributing discs are located in front of the holes of the conveying disc, as shown in the figures.

During said periods the removing means 40, 40', by entering the corresponding holes of discs 27, lift the articles 33 so as to convey them within the holes 23 of disc 20.

The stopping plate 41 prevents the articles from being thrown out of the disc 20.

Subsequently, while the period of rest of the discs 27, 27' is extended and the lifting elements 40, 40' are kept in the upper position, disc 20 starts moving so as to take away the articles 33; thereupon the lifting elements 40, 40' move downwards and also discs 27, 27' start again to rotate.

The delay in re-starting the distributing discs with respect to the conveying disc may be obtained by means of a phase-displacement or by giving the stopping phase of the distributing discs a longer duration than that of conveying disc.

A different duration of the period of rest of the conveying discs and of the distributing disc may be obtained, for example, by operating the discs, by gears mounted on shafts 28, 28' driven by Maltese crosses rotating at the same speed by using, for instance, four clearances for the Maltese cross which controls the conveying disc, and six clearances for the Maltese cross which controls the distributing discs; it is also possible to use Maltese crosses with an equal number of clearances, rotating at different speeds so that they impart different speeds to the various discs.

The feeding of the articles into a machine takes place, in the usual system, when every article reaches station 42, above the lifting element 35 which passes through a hole in bearing 24.

A sheet of paper 37, by the usual means, is conveyed between the article 33 and the counter-lifting element 36. Subsequently, the lifting element 35 and the counter-lifting element 36 get hold of the article and the paper and, pressing them together, convey them to the machine into which they are to be fed.

In this preferred form of embodiment it has also proved useful to cause the distributing discs 27, 27' to rotate in such a direction that the holes therein move in substantially the same direction as the holes in the conveying disc 20 when the former pass beneath the latter, see arrows 30 and 38, FIG. 2, and to give the edge of the conveying disc 20 a considerable thickness. In this way the edge of disc 20, owing to friction, assists in dragging along the articles contained in the enclosure 34 located above the discs 27, 27' so that within said enclosure a proper circulating motion of all of the articles is produced, without obstruction or accumulation of any sort, so that distribution of the articles is aided.

Figure 11:
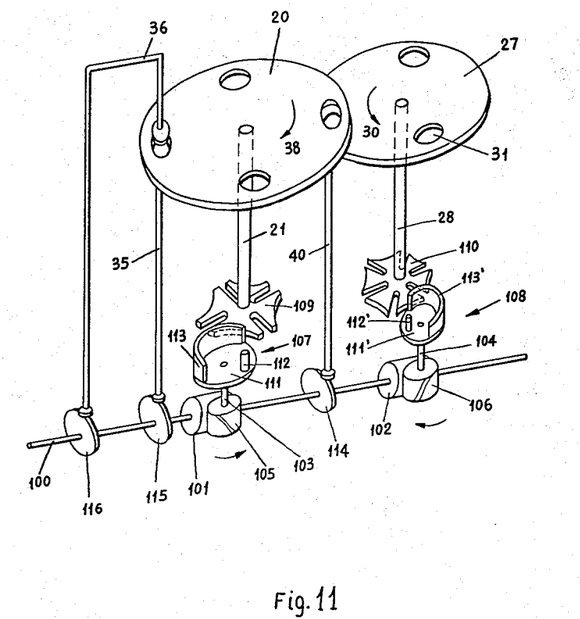
FIG. 11 is a diagrammatic perspective view of the operating system for the mechanism.

FIG. 11 shows by way of example a mechanism for operating the discs 20, 27 and the lifting elements 35, 40. In said figure, for clearness' sake, there are shown only the conveying disc 20 and a distributing disc 27. The other eventual distributing discs, such as disc 27' of FIGS. 1 and 2, obviously may derive the motion of disc 27 through gears keyed on the axis of each of discs 27, 27' and idle return wheels.

The mechanism which will now be described is provided to operate the distributing disc 27 with a number of intermissions twice as that of the conveying disc 20, the disc 27 rotating, at each intermission, by half the amount of the pitch between the holes 31.

The mechanism comprises a shaft 100 rotatable within supports provided stationary on the base; these supports are not shown in the figure.

Two worm wheels 101, 102 are secured to shaft 100 and rotate therewith. Two shafts 103, 104 are rotatably mounted in supports provided stationary on the base (these supports are not shown). To shafts 103, 104 there are secured two worm wheels 105 and 106, respectively which engage with the teeth of said wheels 101 and 102 respectively. The tooth formations 101, 105 are proportioned in such a way that, at each revolution of shaft 100, shaft 103 performs a revolution. The tooth formations 102, 106 are proportioned in such a manner that at each revolution of shaft 100, shaft 104 performs two revolutions by rotating in a direction contrary to that of shaft 103, as shown by the arrows.

To shafts 103, 104 there are fastened the devices 107 and 108, respectively, intended to drag two Maltese crosses 109, 110 which latter are secured to the lower end of shafts 21, 28 carrying respectively conveying disc 20 and distributing disc 27.

Dragging device 107, as usual, is formed from a cup 111 fastened to shaft 103; to the cup 111 there are secured a dragging dowel 112 and a bent stop sector 113

The dragging device 108 is formed from the corresponding elements 111', 112' and 113'. The Maltese cross 109 has four dragging recesses and performs ¼ of revolution at each revolution of shaft 100: thus, conveying disc 20 has corresponding four holes. Maltese cross 110 has six recesses and performs twice ⅙ of revolution at each revolution of shaft 100. Distributing disc is correspondingly provided with three holes. Obviously, it is possible to make use of Maltese crosses having a different or even an equal number of recesses and to obtain at each revolution of shaft 100 any desired number of intermissions of disc 27, which is greater or lesser than that of disc 20.

Of course, also provision is made that the Maltese crosses 109, 110, instead of being keyed on shafts, 21, 28, are keyed on transmission shafts and operate shafts 21, 28 through trains of gears.

It is also obvious that by suitably keying on gears 105, 106, with respect to gears 101, 102, it is in any case possible to obtain that the movement of disc 27 starts after disc 20 has already begun to move.

On shaft 100 there are secured the cams 114, 115, 116 which, in phase with the movement of the discs, bring about the movement respectively of elevators 40 and 35 as well as of counter-elevator 36, through rods guided in supports stationary on the base, which supports are not shown.

In the alternative form of embodiment represented in FIGURES 3 and 4, the distributing discs are located in a higher position than the conveying disc and partially overlap the same. This gives rise to modifications which are quite obvious. The bearing means 24 extend under the area of the conveying disc, from the transfer stations of the articles from the distributing discs to the station of removal.

The bearing means 32 extend under the distributing discs, except for the area overlapping the conveying disc.

In the transfer area stationary separators 43 are provided, which cover said transfer area.

The transfer of the articles from the distributing discs to the conveying disc takes place owing to the articles being dropped onto the latter from the distributing discs.

The durations of the periods of rest of all of the discs may be equal, which permits the distributing discs to be operated by the same intermittent movement operating the conveying disc, for example, by deriving the movement of shaft 21 through the tooth gears 52, 53, 53' as shown in FIG. 3.

Figure 5:
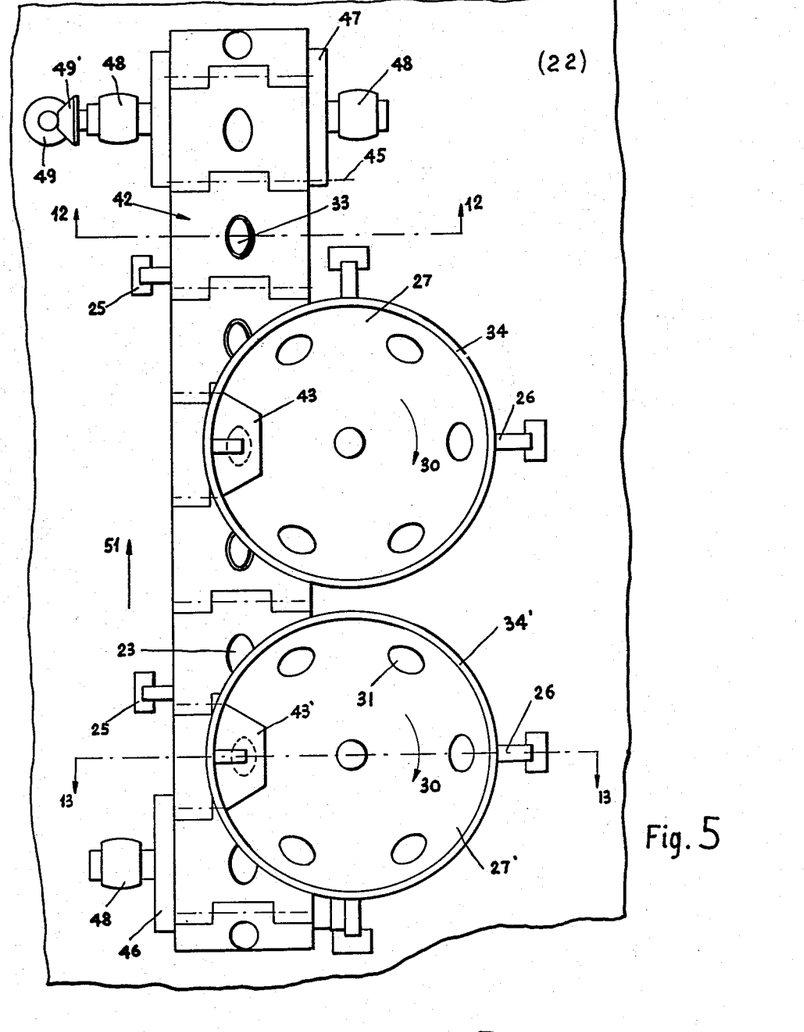
FIG. 5 is a diagrammatic view from the top of the mechanism, in another alternative form of embodiment, in which the elements 36 and 37 are omitted.
Figure 6:
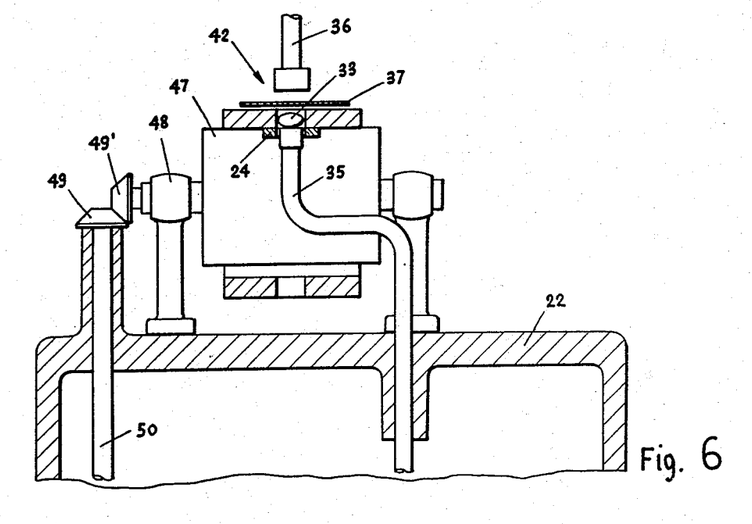
FIGS. 6 and 7 are diagrammatic vertical sections of the mechanism of FIG. 5, according to lines 12—12 and 13—13, respectively, of FIG. 5.
Figure 7:
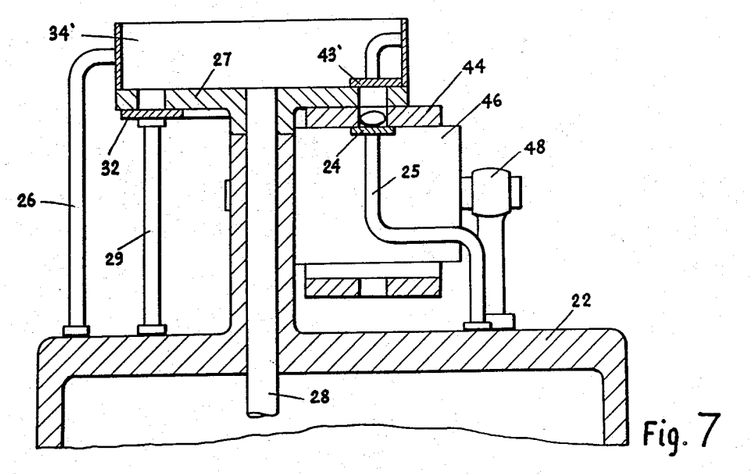

In a further alternative form of embodiment, FIGURES 5, 6 and 7, the conveying means is formed from a chain composed of small plates 44 each provided with at least one hole 23 and adapted to receive an article to be distributed from the distributing discs 27, 27' located above.

Below the small plates 44 a stationary bearing 24 is provided, which is carried by supports 25 for the articles which have entered the holes 23.

The small plates 44 are connected between each other by hinge in the joints 45 and form a chain which is wound on the loose transmission roller 46 and on the driving roller 47, both of which are carried by supports 48 secured to base 22. The driving roller, which by known means meshes with the chain, controls the intermittent forward movement thereof and is operated by any known mechanism, such as a Maltese cross, through the driving shaft 50 guided in base 22, and the pair of bevel gears 49 and 49'.

The distributing discs are caused to rotate intermittently and provision is made so that, during the phases of rest of the conveyor and of the discs, a hole in each disc is aligned with a hole in the conveying chain.

In these phases of rest, the articles from the distributing discs are dropped on the conveying chain.

Thereupon the chain conveys the articles, in the direction of arrow 51, to the lifting element 35 which, during the phases of rest, enters the holes 23 and pushes the article 33 and the sheet of wrapping paper 37 against the counter-lifting element 36.

Then the lifting element 35 and the counter-lifting element 36 move upwards simultaneously, always carrying article 33, which is removed from the holes 23, and the paper sheet 37, feeding the whole into a machine.

Figure 8:
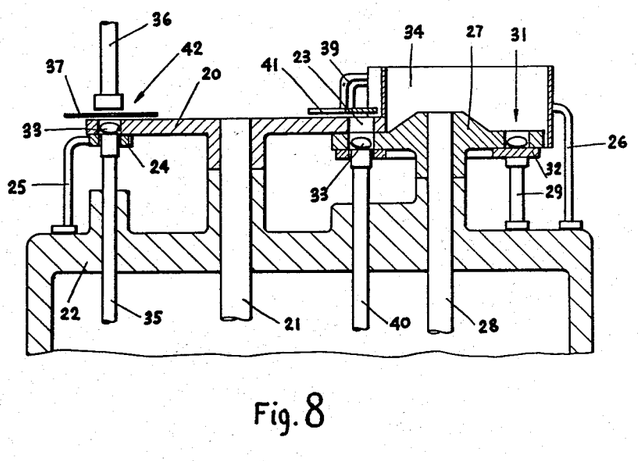
FIG. 8 is a diagrammatic vertical section, according to line 10—10 of FIG. 2, in a further preferred form of embodiment.

According to a further preferred form of embodiment, FIG. 8, the distributing discs are raised in the centre, so that the articles to be distributed tend to be crowded into the peripheral area situated above the holes, so as to facilitate their entering the said holes and to improve the circulation of the articles within the enclosure, as described in connection with FIGURES 1 and 2.

Figure 9:
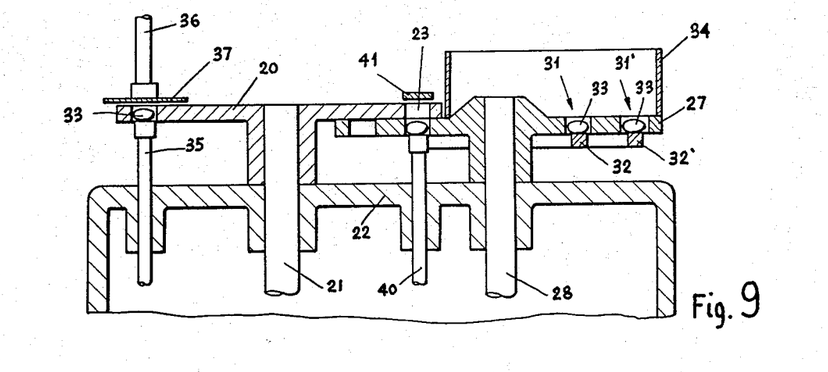
FIG. 9 is a diagrammatic vertical section, according to line 14—14 of FIG. 10, of a further preferred form of embodiment.
Figure 10:
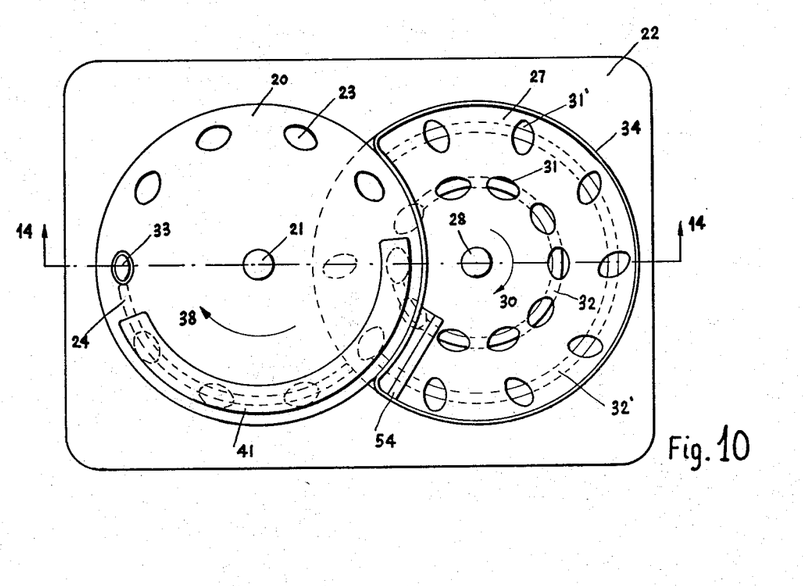
FIG. 10 is a downward view of FIG. 9, the elements 36 and 37 being omitted.

According to a last preferred form of embodiment, FIGURES 9 and 10, at least one distributing disc 27 is provided, which on the periphery has at least two series of holes 31, 31', having corresponding bearings 32, 32' and a conveying disc 20 provided on the periphery with a ring of holes 23, to receive from the distributing discs the articles which have entered the holes of said distributing discs.

The distributing discs and the conveyor are partially overlapping. They are caused to intermittently rotate and the holes are arranged in such a manner so that each of the holes of the distributing disc, during phases of rest of both discs, eventually is aligned with an empty hole of the conveying disc, whereby the holes of the conveying disc are filled with the articles transferred thereto from the holes of the distributing disc, prior to reaching the area of removal.

By this arrangement it is possible to impart to the distributing disc such a number of pauses so that, at every pause, the holes advance only a portion of the angle between two successive holes, with a succession of small shocks which make it very easy for the articles to fall into and to arrange themselves properly within the holes of the distributing disc.

On the other hand, it is also possible to cause the distributing disc to advance by a number of pauses which is lesser than that of the conveying disc, so that the distributing disc moves intermittently forward more slowly. Also this second solution is advantageous insofar as it obtains an easy and regular entering and arrangement of the articles in the holes of the distributing disc.

The distributing disc may be flat or raised in the centre and provided with stationary or movable guide devices for the articles thereon to be distributed.

Also in this case, the distributing discs may, of course, be positioned below or above the conveying disc.

In FIG. 10 also a separator 54 is shown, whose lower edge may be formed from a brush of horsehair or other material, to better and more smoothly push back the articles which have been unable to enter the holes.

It is to be understood that a number of modifications may be made without thereby departing from the scope of the invention as disclosed hereinbefore and defined in the appended claims.

What I claim is:

1. A mechanism for distributing and conveying articles into a machine comprising a conveying disc and at least one distributing disc, said conveying disc and said distributing disc being horizontally mounted for rotation about their respective axes and being each provided with a concentric ring of equally spaced holes therethrough adapted to receive and contain the articles to be conveyed, one of said discs partially overlapping said other disc so that by rotation of said discs said one of holes in said distributing disc is alignable with one of said holes in said conveying disc, said conveying disc and said distributing disc being intermittently rotated in timed relationship so that during some of the phases of rest at least one of said holes in said distributing disc is aligned with one of said holes in said conveying disc, enclosure means mounted above the distributing disc to receive the articles to be distributed, means located adjacent the points where said holes in said distributing disc are in alignment with said holes in said conveying disc to transfer the articles from said holes in said distributing disc to said holes in said conveying disc, means located adjacent said conveying disc but distant from said transfer means to remove the articles from said conveying disc and feed them into a machine, support means beneath said holes in said conveying disc except at the points of transfer of the articles from said distributing disc to said conveying disc extending in the direction of rotation of the latter from said transfer means to said removal means, and support means positioned beneath said holes in said distributing disc except at the points of transfer of the articles from said distributing disc to said conveying disc.

2. The device of claim 1 wherein there are two distributing discs.

3. The device of claim 1 wherein each of said intermittent movements of said distributing disc is through the angle between successive holes therein.

4. The device of claim 1 wherein each of said intermitent movements of said distributing disc is through an angle less than the angle between successive holes therein.

5. The device of claim 1 wherein said distributing disc is positioned below said conveying disc.

6. The device of claim 5 wherein said transfer means comprises lifting means having a lifting element operating between said rotations of said conveying disc and said distributing disc up into said holes in the latter to elevate the articles from said last named holes into said holes in said conveying disc.

7. The device of claim 6 wherein the intermissions between said rotations of said distributing disc are of greater duration than the intermissions between said rotations of said conveying disc, whereby the articles being transferred to said holes in the latter by said lifting element can be sustained in said last named holes by said element until the subsequent rotation of said conveying disc.

8. The device of claim 1 wherein said distributing disc positioned above said conveying disc.

9. The device of claim 1 wherein said distributing disc is provided with a raised conical portion about its axis sloping downwards towards the periphery thereof.

10. The device of claim 1 wherein there is a single distributing disc, said disc having a second concentric ring of equally spaced holes therethrough, said last named ring being located between said peripheral ring and the center of said disc.

11. A mechanism according to claim 1, in which at every movement of the distributing discs the latter rotate by the angle between two holes with the number of intermittences being smaller than that of the conveying disc.

12. A mechanism according to claim 1, in which there are at least two distributing discs and their holes are adapted to receive articles of different types and of a different shape, the conveying means being adapted to receive in succession from the distributing disc said articles and to convey them to the means of removal to achieve an alternating feed of articles of at least two types.

13. Mechanism for distributing and conveying articles into a machine comprising a conveying disc, a distributing disc said conveying disc partially overlapping said distributing disc, each of said discs being provided near the periphery with a plurality of equally spaced holes extending therethrough and adapted to receive and contain an article and being intermittently rotated in timed relationship so that during some of the phases of rest thereof at least one hole of the distributing disc is aligned with a corresponding hole of said conveying disc, supports provided under the holes in the discs, means for transferring the articles from the holes of the distributing disc to the holes of the conveying disc, and means to remove the articles from said conveying disc and to feed them into the machine.

References Cited in the file of this patent

UNITED STATES PATENTS

| | | |
|---|---|---|
| 1,911,650 | Smith | May 30, 1933 |
| 1,947,609 | McNamara | Feb. 20, 1934 |
| 2,667,961 | Reese et al. | Feb. 2, 1954 |
| 2,674,754 | Hale | Apr. 13, 1954 |
| 2,718,331 | Seragnoli | Sept. 20, 1955 |
| 2,778,478 | Brook | Jan. 22, 1957 |
| 2,860,760 | Yeo | Nov. 18, 1958 |

FOREIGN PATENTS

| | | |
|---|---|---|
| 724,206 | Great Britain | Feb. 16, 1955 |